(12) United States Patent
Pacenzia et al.

(10) Patent No.: US 6,895,100 B1
(45) Date of Patent: May 17, 2005

(54) METHOD TO IDENTIFY A KEY PROFILE, MACHINE TO IMPLEMENT THE METHOD AND APPARATUS FOR THE DUPLICATION OF KEYS UTILIZING THE MACHINE

(75) Inventors: Stefano Pacenzia, Vittorio Veneto (IT); Ettore Casagrande, Vittorio Veneto (IT); Eros Foscan, Vittorio Veneto (IT)

(73) Assignee: Silca S.p.A., Vittorio Veneto (IT)

( * ) Notice: Subject to any disclaimer, the term of this patent is extended or adjusted under 35 U.S.C. 154(b) by 0 days.

(21) Appl. No.: 09/890,450

(22) Filed: Aug. 1, 2001

(30) Foreign Application Priority Data

Mar. 5, 1999 (IT) .......................................... VE99A0010

(51) Int. Cl.[7] .................................................. G06K 9/00
(52) U.S. Cl. ............................. 382/100; 409/81; 76/110; 358/540
(58) Field of Search ................................ 382/100, 108, 382/141, 154, 286; 359/378; 345/419–427; 356/12, 393; 409/80, 81, 83, 96; 76/110; 358/540

(56) References Cited

U.S. PATENT DOCUMENTS

| | | | | |
|---|---|---|---|---|
| 4,121,292 A | * | 10/1978 | Galanis et al. | 382/141 |
| 4,301,373 A | * | 11/1981 | Sjodin | 250/559.06 |
| 4,710,808 A | * | 12/1987 | Hoogenboom et al. | 348/136 |
| 4,899,391 A | * | 2/1990 | Cimino et al. | 381/100 |
| 5,127,532 A | * | 7/1992 | Cimino et al. | 211/120 |
| 5,293,687 A | * | 3/1994 | Willoughby et al. | 29/894.35 |
| 5,807,042 A | | 9/1998 | Almblad et al. | |
| 6,152,662 A | * | 11/2000 | Titus et al. | 409/132 |

FOREIGN PATENT DOCUMENTS

| | | | |
|---|---|---|---|
| EP | 0 053 730 | 6/1982 | |
| FR | 2 489 535 | 3/1982 | |
| WO | WO 99/06179 | * 11/1999 | B23Q/35/128 |

* cited by examiner

Primary Examiner—Samir Ahmed
Assistant Examiner—Anand Bhatnagar
(74) Attorney, Agent, or Firm—Birch, Stewart, Kolasch & Birch, LLP

(57) ABSTRACT

A method to identify a key profile, comprising:
illuminating with two laminar beams emitted by two laser light sources said two sides of said shank of a key driven to move axially relative to said beams,
reading with two video cameras, fixed relative to said sources and having their optical axis inclined to said planes in which said light beams lie, said two light profiles formed by said laminar beams striking said two surfaces of said shank of said keys,
digitizing said optical images read in this manner, to obtain two sequences of signals representative of said profiles of said two lateral surface portions of said key, as instantaneously illuminated by said laminar beams and read by said video cameras,
reconstructing from said signals, by means of a processor unit, a signal representative of the entire key profile, and
comparing said thus reconstructed signal with said signal representative of profiles stored in said processor unit to obtain data identifying said profile of said read key.

20 Claims, 3 Drawing Sheets

METHOD TO IDENTIFY A KEY PROFILE, MACHINE TO IMPLEMENT THE METHOD AND APPARATUS FOR THE DUPLICATION OF KEYS UTILIZING THE MACHINE

This application is the national phase under 35 U.S.C. § 371 of PCT International Application No. PCT/EP00/01792 which has an International filing date of Feb. 1, 2000, which designated the United States of America and was published in English.

FIELD OF INVENTION

This invention relates to a method to identify a key profile, a machine to implement the method and an apparatus for the duplication of keys utilizing the machine.

DESCRIPTION FOR THE PRIOR ART

Keys for locks or cylinders are known comprising a head of the most varied shapes and a shank having a profile compatible with the lock or cylinder associated with said key and suitable for receiving a series of notches which overall form the key notching pattern, ie its personalization for operating that particular lock or cylinder.

If it is required to form an additional key able to operate a given lock or cylinder, a blank key, ie having the profile corresponding to that lock or cylinder but without the notching, has to be taken and be cut to form in it the notches required to operate that lock or cylinder.

This notching of a blank key can be effected either by copying an already cut key, or by cutting the blank key on the basis of a code memorized in an appropriate file. In both cases, cutting the blank key requires the use of a so-called duplicating machine provided with a tool able to form the notches corresponding to the required notching pattern, however whereas in the first case the tool operation is controlled by a member which has mechanically or optically read the notching on the key to be duplicated, in the second case the tool operation is controlled by a computer in whose memory the notching pattern to be reproduced is recorded.

Hence there is the problem of exactly identifying (reading) the profile of the blank key to be cut, this being a laborious operation for which a certain uncertainty exists, in that thousands of different key profiles are available commercially, sometimes differing by often imperceptible differences.

This problem is currently solved by a search based on the experience of the operator, or at the worst by comparing the key to be duplicated with the pattern of available blank keys, which can be seen from catalogues. This is obviously a laborious operation with some uncertainty for the operator, and the risk of duplicating a key not able to be inserted into the corresponding lock or cylinder.

A further drawback is that even if the exact profile for the blank key to enable duplication has been correctly identified, there is always the problem of checking whether the cutting operation has been correctly carried out, this problem being particularly acute if the original key to be duplicated is considerably worn, in that the resultant key notching pattern does not reproduce the nominal pattern of the original key, but of the key as it currently appears, to which further tolerances have to be added deriving from the duplicating process.

WO 99 06179 discloses a method and apparatus for duplicating an original key, in which the keyway and keycode of the original key are measured and duplicated in a preform. The preform used in the duplication process need not include any keyway or keycode prior to the duplication process and, therefore, a single type of preform may be used in generating duplicates of many different types of keys. The apparatus may be automated to take the measurements of the original key and to cut the duplicate key, thus reducing the possibility of producing a nonfunctional duplicate.

U.S. Pat. No. 4,899,491 describes a method for identifying with satisfactory precision the profile of an already notched key to be duplicated. It uses a video camera positioned in a fixed position in front of the key to determine the image of the profile, which after digitizing is compared with data memorized in a control unit.

A drawback of this solution is that the video camera determines only the key profile resulting from frontal observation, and as the video camera is focused on the end of the key shank, and hence views the profile as appearing at its end part, if at this end there exists notching which substantially reduces its profile, the reading is evidently false or incomplete, as is the subsequent comparative analysis effected by the control unit.

A further drawback of this solution is that although it is generally able to detect the profile of a key, it is however not able to detect its notching pattern and hence can neither compare the original key with the duplicated key to verify that it has been correctly cut, nor can it transfer its parameters to a duplicating machine.

The problem is solved according to the invention by a method to identify a key profile as claimed in claim 1.

To implement the method the invention provides a machine as claimed in claim 6.

The invention also refers to an apparatus for the duplication of keys as claimed in claim 16.

BRIEF DESCRIPTION OF THE DRAWINGS

A preferred embodiment of the invention is described in detail hereinafter by way of non-limiting example with reference to the accompanying drawings, on which.

DESCRIPTION OF PREFERRED EMBODIMENTS

Figure 1:
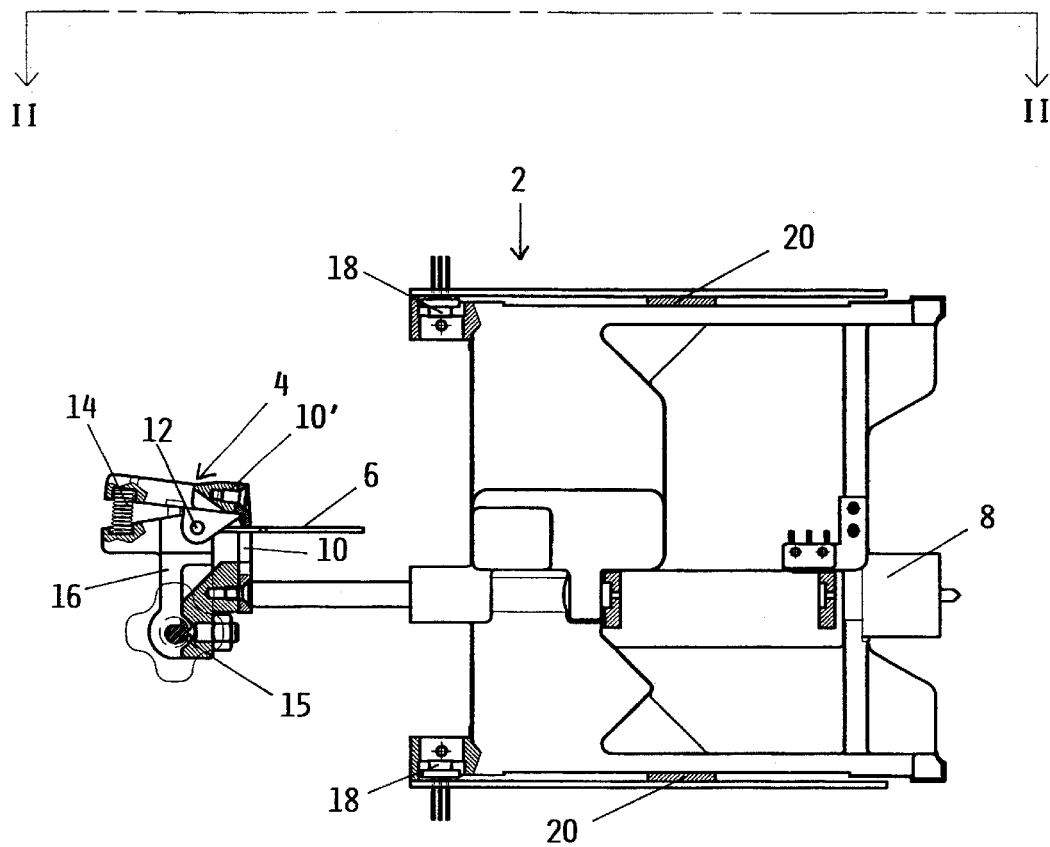
FIG. 1 is a partly sectional side view of a machine for implementing the method of the invention.
Figure 2:
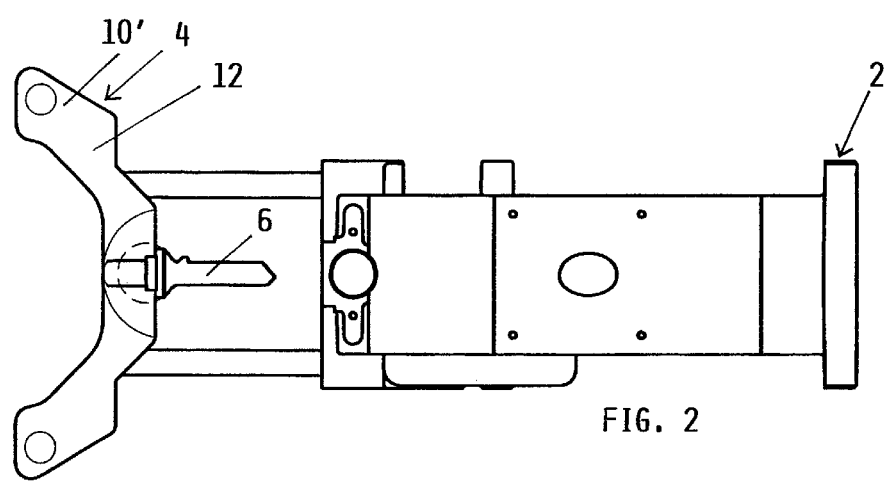
FIG. 2 is a plan view thereof from above in the direction of the line II—II of FIG. 1.
Figure 3:
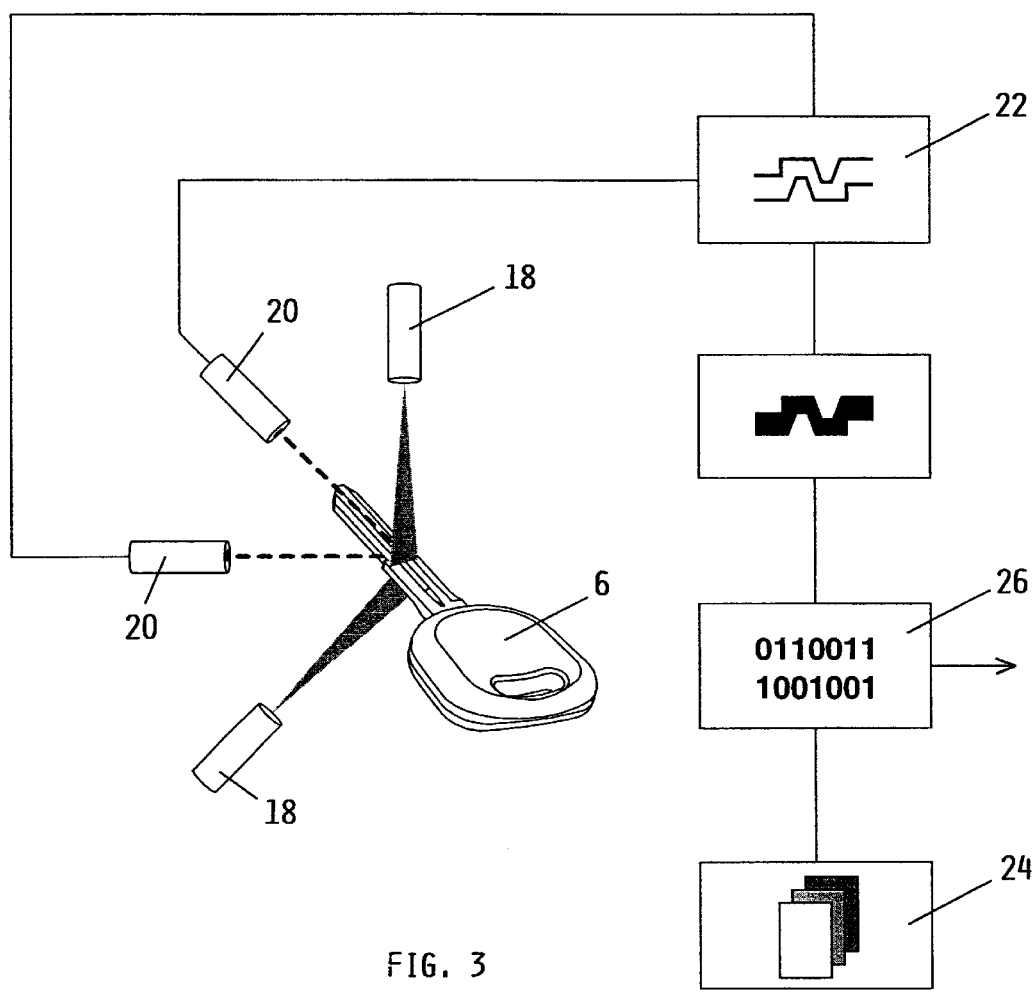
FIG. 3 is a schematic illustration of the method of the invention.

As can be seen from the figures, the method of the invention uses a machine comprising a base frame, indicated overall by 2, on which there is mounted a clamp 4 for a key 6, the profile of which is to be determined. The clamp 4 is mounted on a traditional linear actuator 8 able to move it in both directions parallel to the longitudinal axis of the key 6 retained by said clamp.

The clamp 4 comprises a pair of jaws 10, 10', one of which 10 is fixed to the linear actuator 8 and the other 10' is hinged to the first on a pair of coaxial horizontal pins 12.

Two springs 14 are interposed between the two jaws 10, 10' to maintain the jaws in their closed configuration.

To prevent these springs yielding to cause unintentional opening of the clamp 4 in certain circumstances, for example if the key for which the profile is to be determined forms part of a bunch of keys, the weight of which could open said clamp, a device comprising a cam 15 and rod 16 is provided to lock the two jaws 10, 10' in their closed position.

On the frame 2 there are also mounted two laser sources 18 provided with an optical system or other suitable device able to transform the diverging conical beam of emitted laser light into a laminar beam perpendicular to the plane in which the shank of the key 6 lies. The two laser sources 18 are arranged in a facing position symmetrical about the plane in which the key is moved, so that the two laminar beams emitted by them are substantially coplanar and perpendicular to the axis of its shank.

On the frame 2 there are also mounted two video cameras 20, the optical axis of which is inclined to the plane of the laminar laser beams and, as will be apparent hereinafter, extends in the direction in which said laminar beams strike the shank of the key 6.

The video cameras 20 are connected to the processor unit 22 for the read images.

The reading machine operates in the following manner: after positioning on the clamp 4 the key 6 the profile of which is to be determined, the linear actuator 8 is operated to drive the key axially, in order to cause the plane defined by the two laser light beams emitted by the two sources 18 to cross its shank. As these beams gradually strike the two surfaces of the shank of the key 6, they by virtue of their laminar form illuminate them in accordance with a variation related to the profile of the corresponding surface, and to the notching pattern of the key.

The two video cameras 20 read these profiles and transmit the corresponding sequences of digitized data to the processor unit 22.

From the aforegoing it is apparent that the method of the invention is particularly advantageous, and in particular.

it enables a key profile to be read without errors or uncertainties, in that it determines the profile along the entire length of the key shank and is consequently insensitive to any notching or wear involving specific regions of the shank;

it is virtually insensitive to key wear, as the software can make the necessary corrections to the read profile in order to obtain the original profile;

it enables the key notching pattern to be read whether it is of paracentric type, punched type or lateral notch type, better known as laser type, and is consequently able both to compare the notching of the original key with the notching of a duplicated key, and to control a duplicating machine to obtain a copy of the read key;

it also enables the profile and notching pattern to be determined for single-bitted and double-bitted keys if a clamp suitable for this type of key is used, for which reason it is preferable to provide the machine with an interchangeable clamp.

The same advantages also apply to the machine which implements the method, and which can either comprise its own display and own memory, or operate in combination with a managing computer.

Figure 4:
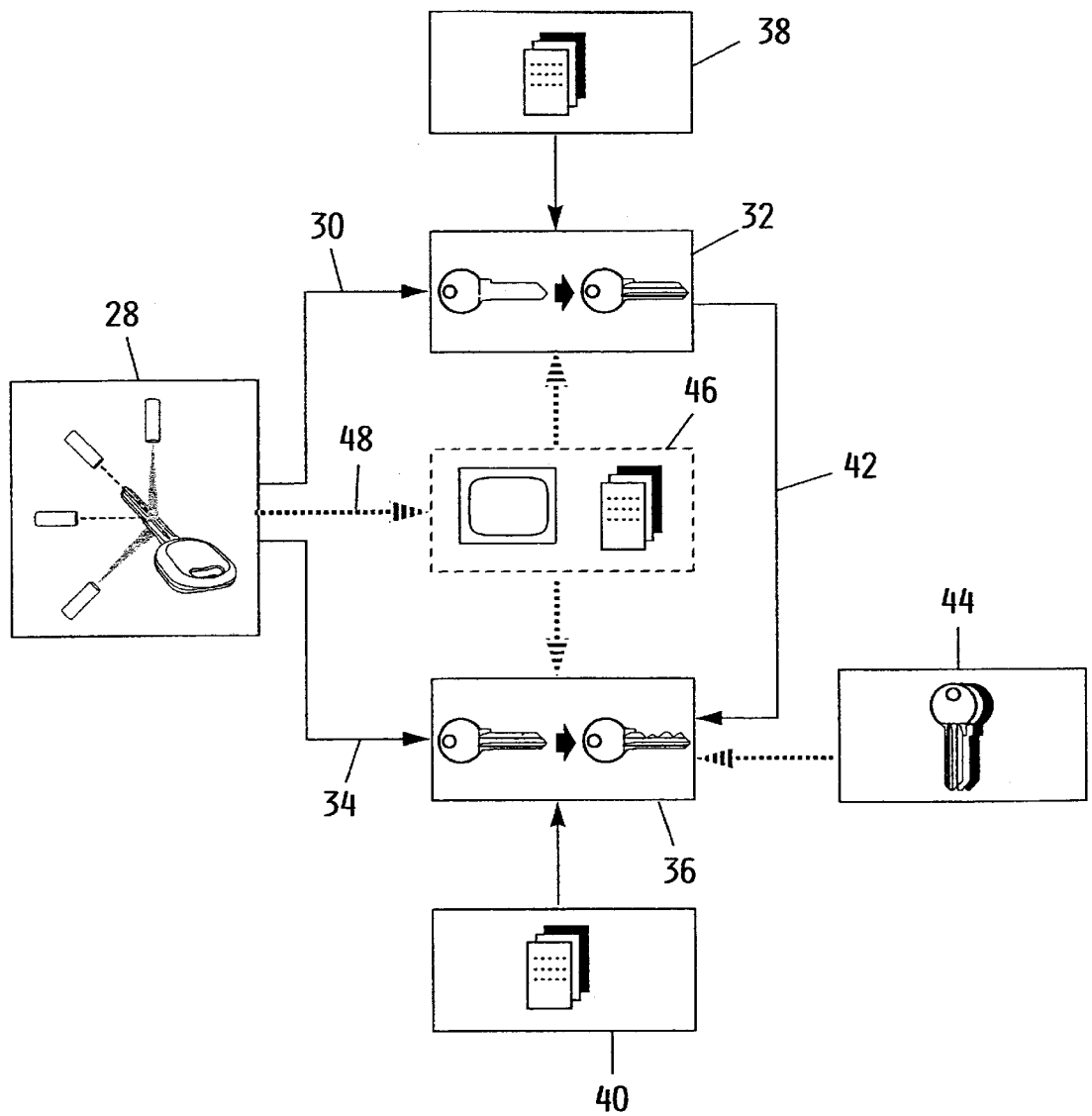
FIG. 4 shows a block diagram of a key duplicating apparatus utilizing the reading machine according to the invention.

An advantageous utilization of the reading machine according to the invention consists, as already said, of its insertion in a key duplicating apparatus, schematically shown in FIG. 4. As can be seen, the reading machine according to the invention has been indicated, as a whole, by 28 and is connected to a milling machine 32 through a line 30, transmitting the data consequently able both to compare the notching of the original key with the notching of a duplicated key, and to control a duplicating machine to obtain a copy of the read key;

it also enables the profile and notching pattern to be determined for single-bitted and double-bitted keys if a clamp suitable for this type of key is used, for which reason it is preferable to provide the machine with an interchangeable clamp.

The same advantages also apply to the machine which implements the method, and which can either comprise its own display and own memory, or operate in combination with a managing computer.

An advantageous utilization of the reading machine according to the invention consists, as already said, of its insertion in a key duplicating apparatus, schematically shown in FIG. 4. As can be seen, the reading machine according to the invention has been indicated, as a whole, by 28 and is connected to a milling machine 32 through a line 30, transmitting the data referring to the profile of the read key, and to a duplicating machine 36 through a line 34 transmitting the codification data of the read key.

While operating the machine 28 reads from an original key to be duplicated the data referring to its profile and to its codification and transmits the former to the milling machine 32 through the line 30 and the latter to the duplicating machine 36 through the line 34.

The milling machine 32, which is fed with "cuts" of keys, i.e. with pieces of metal sheet having the shape of key with head and with shank without grooves and codification notches, performs on said shank the grooves corresponding to those of the original key, by utilizing the data coming from the reading machine 28, previously compared with the data stored in the data base 38.

Through this milling step the cut of key becomes a raw key, which is transferred, preferably through a transport line 42, to the duplicating machine 36. This performs on its shank the codification corresponding to that of the original key, by utilizing in this step the data coming from the machine 28, previously compared with the data stored in the data base 40.

It is also possible that the duplicating machine 36 instead of being fed with raw keys coming from the milling machine 32, is fed with raw keys coming from a store 44.

Furthermore it is foreseen that the data bases 38 and 40 of the milling machine 32 and of the duplicating machine 36, respectively, can be replaced by the data base of a computer 46, which controls both machines and is directly connected to the reading machine 28 through a line 48 to transmit the profile and codification data of the read key.

What is claimed is:

1. A method for identifying a key profile which comprises:

simultaneously illuminating with two coplanar laminar beams emitted by two laser light sources the two sides of a shank of a key, driven to move axially relative to said beams, each beam being perpendicular to both a plane in which the shank of the key lies and to the axis of the shank of the key, simultaneously reading with two video cameras fixed relative to said laser light sources and having their optical axis inclined to the planes in which said light beams lie, said two light profiles formed by said laminar beams striking the two surfaces of the shank of said key, simultaneously digitizing the optical images read in this manner to obtain two sequences of signals representative of the profiles of the two lateral surface portions of the key, as instantaneously illuminated by said coplanar laminar beams and read by said video cameras, reconstructing from said signals, by means of a processor unit, a signal representative of the entire key profile and comparing the thus reconstructed signal with the signal representative of profiles stored in said processor unit to obtain data identifying the profile of said read key.

2. The method of claim 1 wherein conical beams emitted by each laser source are transformed into a laminar beam by passing through an optical system positioned in front of said light source.

3. The method of claim 1 wherein, during illumination of the shank of the key by the two laminar beams, said shank is moved axially to the laser sources, which are maintained fixed.

4. The method of claim 1 wherein an optical image of a key profile is reconstructed from the digitized signals representative of the optical images read by said video cameras.

5. A device for identifying a key profile which comprises:
a support for a key, the profile of which is to be identified,
a pair of laser light sources for simultaneously introducing two coplanar laminar beams of said laser light onto two sides of the shank of said key,
means for axially driving the shank of said key relative to said laminar beams,
a pair of video cameras fixed relative to said laser light sources and having their optical axis inclined to planes in which said laminar beams lie and oriented in a direction of the two light profiles formed by said laminar beams striking the two lateral surfaces of the shank of said key,
means for digitizing the optical images read by said video cameras and for converting them into two sequences of signals representative of the profiles of the two lateral key surfaces, as instantaneously illuminated by said laminar beams,
a processor unit to convert the digitized signals into a signal representative of the entire profile of the key,
a memory containing data representative of known key profiles, and
means for comparing data read from said memory with said signal representative of the entire profile of the key.

6. The device of claim 5 wherein the support for the key consists of a clamp with two jaws acting on a neck of said key.

7. The device as claimed in claim 6 wherein the clamp comprises a pair of jaws, and biasing means operatively connected with said jaws for biasing them in a closed position.

8. The device of claim 6 wherein the clamp is mounted with one of its two jaws on a linear actuator having its operating axis parallel to the axis of the shank of the key.

9. The device of claim 8 wherein the clamp for the key is mounted on said linear actuator which is fixed, together with said laser light sources and said video camera, to said base frame.

10. The device of claim 6 wherein the clamp comprises a pair of jaws, and means are provided for maintaining the jaws in a closed position.

11. The device of claim 10 wherein at least one of the two jaws is associated with a rod operated by a cam for holding the jaws together.

12. The device as claimed in claim 6 wherein the processor and the memory unit are an external computer.

13. An apparatus for duplicating keys using the key profile identification device of claim 5 which further comprises key duplicating machine connected to the key profile identification device, and means for transmitting codification data from the key profile identification device to the key milling machine.

14. The apparatus of claim 13 wherein a store of raw keys is connected with the key duplicating machine.

15. The apparatus of claim 13 wherein the key machine is provided with a data base containing data referring to the different codifications of keys.

16. The apparatus of claim 13 which further comprises a milling machine connected with the key duplicating machine and means for transmitting profile data from the key profile identification device to the milling machine.

17. The apparatus of claim 13 wherein the key milling machine is provided with a data base containing data referring to the different profiles of keys.

18. The apparatus according to claim 15 or 17 wherein the key profile identification device is connected to a computer having a memory which is the data base of said key milling machine and/or said key duplicating machine.

19. The device of claim 5 further including a base frame on which the two laser light sources and the two video cameras are mounted symmetrically about and on opposite sides of the shank of the key supported by said support.

20. The device of claim 5 wherein a pair of diaphragms are applied to the laser light sources to transform the conical light beams emitted thereby into laminar beams.

* * * * *